United States Patent
Kramer

(10) Patent No.: US 7,270,023 B2
(45) Date of Patent: Sep. 18, 2007

(54) GEARBOX FOR VEHICLE

(75) Inventor: Thomas Kramer, Oldenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 525 days.

(21) Appl. No.: 10/639,733

(22) Filed: Aug. 12, 2003

(65) Prior Publication Data

US 2005/0072254 A1    Apr. 7, 2005

(30) Foreign Application Priority Data

Sep. 10, 2002 (DE) .............................. 102 41 743

(51) Int. Cl.
*F16H 37/00* (2006.01)
*F16H 37/06* (2006.01)

(52) U.S. Cl. .................... 74/15.4; 74/15.8; 74/665 GA

(58) Field of Classification Search .................... 74/11, 74/15.4, 15.6, 15.63, 15.66, 15.8, 15.82, 74/15.84, 15.86, 325, 15.88, 665 GA, 340, 74/352, 371, 372; 192/69.9, 69.91
See application file for complete search history.

(56) References Cited

U.S. PATENT DOCUMENTS

| | | | | |
|---|---|---|---|---|
| 3,302,468 A | * | 2/1967 | Wright et al. ................. 74/15.8 |
| 4,604,908 A | * | 8/1986 | Dolan ........................ 74/15.88 |
| 4,813,290 A | * | 3/1989 | Hone ......................... 74/15.88 |
| 4,862,755 A | * | 9/1989 | Eastman et al. ........... 74/15.88 |
| 4,876,924 A | * | 10/1989 | Fletcher et al. ................ 74/745 |
| 4,901,600 A | * | 2/1990 | Wilson ........................ 74/745 |
| 5,062,313 A | * | 11/1991 | Fletcher ....................... 74/335 |
| 5,245,892 A | * | 9/1993 | Kim et al. ............. 74/665 GA |
| 5,289,730 A | * | 3/1994 | Wilson et al. ............. 74/15.88 |
| 5,311,787 A | * | 5/1994 | Wilson et al. ............. 74/15.88 |
| 5,383,374 A | * | 1/1995 | Reynolds ................... 74/15.66 |
| 6,314,827 B1 | * | 11/2001 | Matsufuji .................... 74/325 |

FOREIGN PATENT DOCUMENTS

| | | |
|---|---|---|
| DE | 1 806 386 | 3/1957 |
| DE | 1 141 894 | 12/1962 |
| DE | 1 221 564 | 7/1966 |
| DE | 199 22 116 A1 | 11/2000 |

* cited by examiner

*Primary Examiner*—Richard Ridley
*Assistant Examiner*—James Pilkington
(74) *Attorney, Agent, or Firm*—Davis Bujold & Daniels, P.L.L.C.

(57) ABSTRACT

A transmission for a vehicle is proposed which comprises one main transmission MT with one input shaft (1) and one output shaft (2), the same as at least one range change group (3) and one power take off, wherein one countershaft (5) integrated in the range change group (3) for actuating a power take off, the countershaft (5) being connectable, via a gear change sleeve unit (6), with the input shaft (1) and the output shaft (2) and the power take off can be driven independently of the operating state of the vehicle.

6 Claims, 5 Drawing Sheets

GEARBOX FOR VEHICLE

FIELD OF THE INVENTION

The invention concerns a transmission for a vehicle.

BACKGROUND OF THE INVENTION

From the vehicle technology transmissions which comprise one input shaft and one output shaft are known. In addition, it is possible to provide a countershaft in the main transmission which actuates a power take off. It is also possible to rear mount a range change group on the main transmission. But in the already known transmission, the ratio steps for the power take off (PTO) are disadvantageously limited.

German Publication No. DE 199 22 116 A1 has disclosed also a two-countershaft transmission. The two-countershaft transmission makes it possible to reduce a torque for the power take off without at the same time disturbing the load compensation of a gear wheel between the two countershafts so that a PTO operation no longer depends on the engaged gear and the centering of the constant can be eliminated. This is specifically obtained by the power take off shaft used being driven by a power take off wheel, via a main shaft wheel, the radial force between the power take off wheel and the main shaft wheel being absorbed by a plate mounted on the power take off shaft and on the main shaft wheel.

The problem on which the invention is based is to propose a transmission of the above mentioned kind in which the ratio step possible for the power take off are increased.

SUMMARY OF THE INVENTION

An inventive transmission for a vehicle is accordingly proposed in which a countershaft integrated in the range change group is provided for the transmission system of a power take off. The countershaft can be connected, via a gear change sleeve unit, with the input shaft and/or the output shaft according to the shifting state, the power take off being actuatable independently of an operating state of the vehicle. In this manner, the maximum number of available ratio steps for the power take off operation results from multiplication of the number of ratio steps of the main transmission and the number of ratio steps of the range change group. When additional groups are associated with the main transmission, the number of ratio steps available for the power take off range can increase further.

Within the scope of an advantageous development of the invention, the gear change sleeve unit can be provided with at least two gear change sleeves, it being preferred that the first gear change sleeve be located upon the input shaft and the second gear change sleeve upon the output shaft. The two gear change sleeves are situated on the shafts, respectively, axially displaceably and fixedly. The gear change sleeve unit can also have more than two gear change sleeves.

According to the invention, both gear change sleeves of the gear change sleeve unit are coupled, in an axial direction, via a connecting plate or the like with the connecting plate being actuatable via a shift fork.

One development of the invention can provide that the countershaft, integrated in the range change group, has a first wheel as a first ratio step and a second wheel as a second ratio step so that at least one two-step ratio can be implemented for the power take off. It is conceivable also to increase the number of ratio steps in the range change group.

With the gear change sleeve unit, different shifting states can be implemented for the power take off in the range change group. It is thus possible that the power take off is actuatable both when the vehicle is moving and when it is parked.

BRIEF DESCRIPTION OF THE DRAWINGS

The invention will now be described, by way of example, with reference to the accompanying drawings in which.

DETAILED DESCRIPTION OF THE INVENTION

Figure 1:
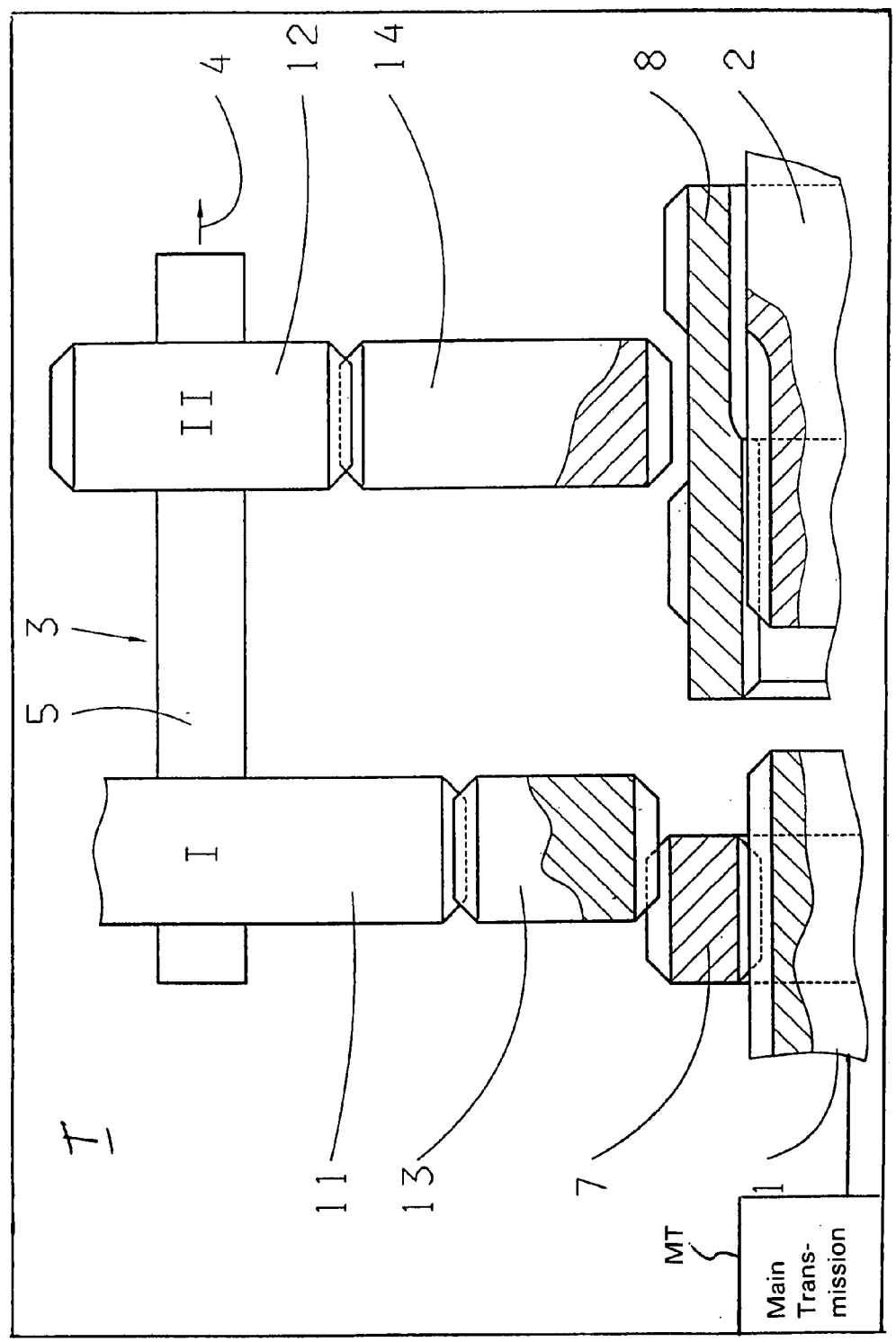
FIG. 1 is a cut partial view of an inventive transmission with a range change group in a first shifting state.

In FIGS. 1 to 5 is shown a possible embodiment of the inventive transmission for a vehicle. The transmission T comprises a main transmission MT (not shown in further detail) with one input shaft 1 provided as intermediate shaft of the main transmission MT and one output shaft 2, the same as a range change group 3 and a power take off.

It is provided according to the invention that for actuating a power take off, which is indicated with an arrow 4 in FIGS. 1 to 4, a countershaft 5, integrated in the range change group 3 is provided. The countershaft 5 is connected, via a gear change sleeve unit 6, with the input shaft 1 and/or the output shaft 2 according to the shifting state. In this manner, the power take off is driven independently of the operating state of the vehicle.

Figure 5:
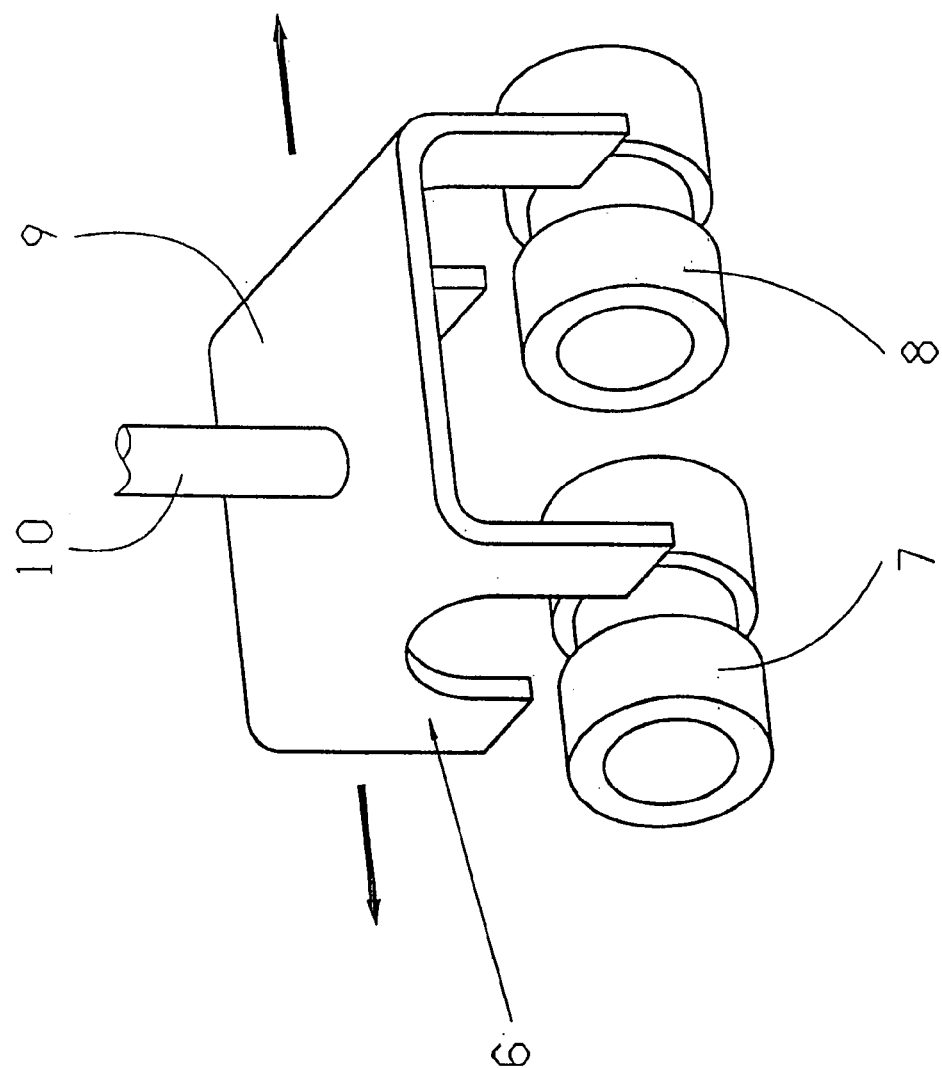
FIG. 5 is a diagrammatic three-dimensional view of a gear change sleeve unit of the inventive transmission.

Diagrammatically indicated in FIG. 5, the gear change sleeve unit 6 has two gear change sleeves 7, 8, the first gear change sleeve 7 being mounted on the input shaft 1 and the second gear change sleeve 8 on the output shaft, respectively, axially displaceably and non-rotatably. The two gear change sleeves 7, 8 are coupled, in an axial direction, via a connecting plate 9 in which connecting plate 9 is actuated via a shift fork 10. The gear change sleeve unit 6, appearing in FIG. 5, is shown only by way of example. It is possible that the gear change sleeve unit 6, especially the connecting plate 9, is designed differently. The axial motion of the coupled gear change sleeves 7, 8 with the connecting plate 9 is indicated in FIG. 5 by corresponding arrows.

In this embodiment, the countershaft 5 has two wheels 11, 12. The first wheel 11 forms the first ratio step I and the second wheel 12 forms the second ratio step II of the range change group 3. The first ratio step I is designated as ratio $i_{Step\ I}$ and the second ratio step II as ratio $i_{Step\ II}$. In this manner, by virtue of the inventive transmission, different gear change states are implemented for the power take off by the gear change sleeve unit.

In FIG. 1 a first shifting state during the down time of the vehicle is indicated. Here the input shaft 1 with the first gear change sleeve 7 is connected via a first intermediate wheel 13 with the first ratio step I of the countershaft, that is, the first wheel 11, and the power take off is driven with a ratio $i_{Step\ I}$.

Figure 2:
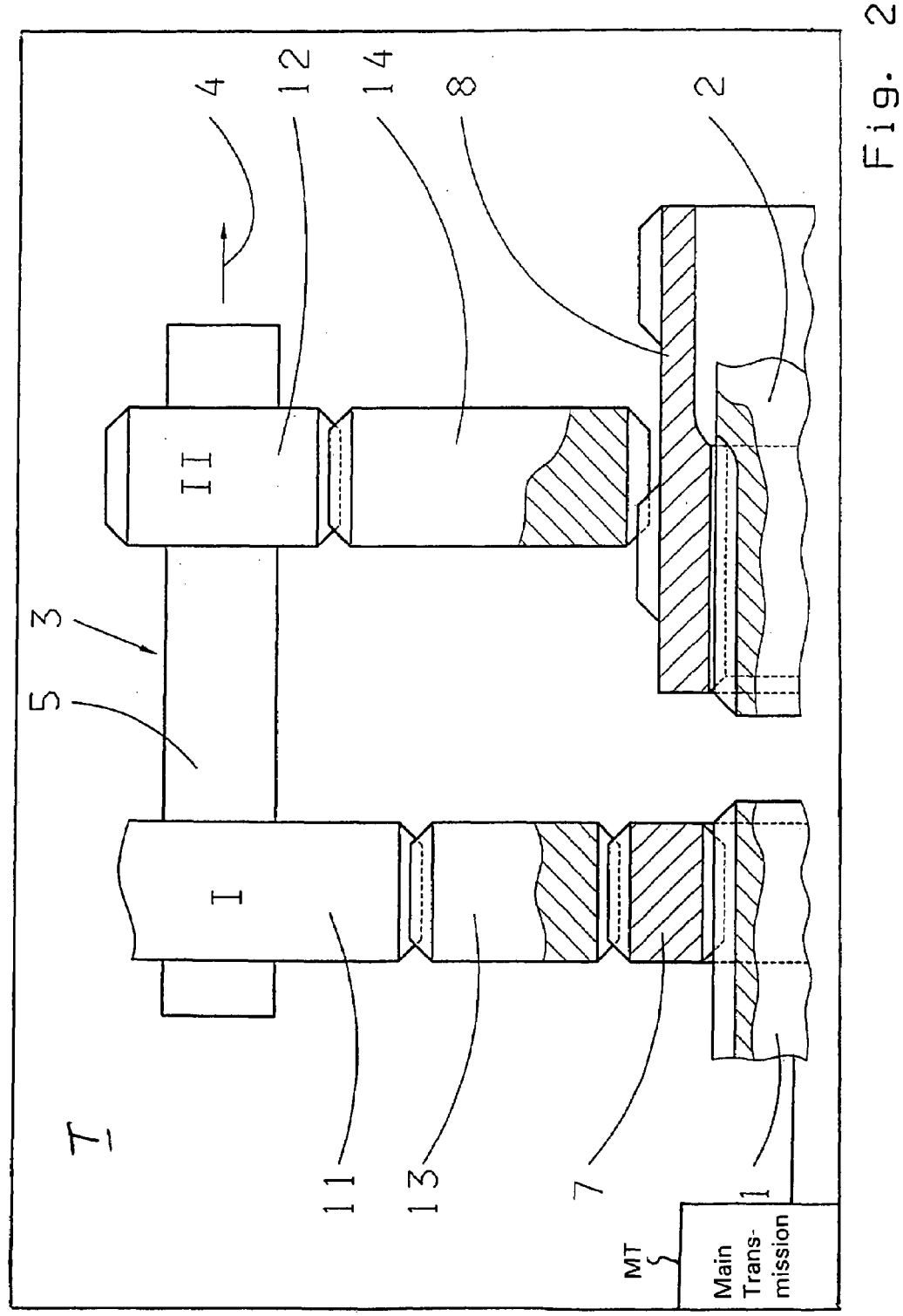
FIG. 2 is a cut partial view of an inventive transmission with a range change group in a second shifting state.

In FIG. 2 a second shifting state when the vehicle is moving is shown. The input shaft 1 with the first gear change sleeve 7 is coupled via the first intermediate wheel 13 with the first wheel 11 of the countershaft 5. The second countershaft wheel 12 is connected via a second intermediate wheel 14, with the second gear change sleeve 8 upon the output shaft 2 so that the power take off is driven with the ratio $i_{Step\ I}$.

Figure 3:
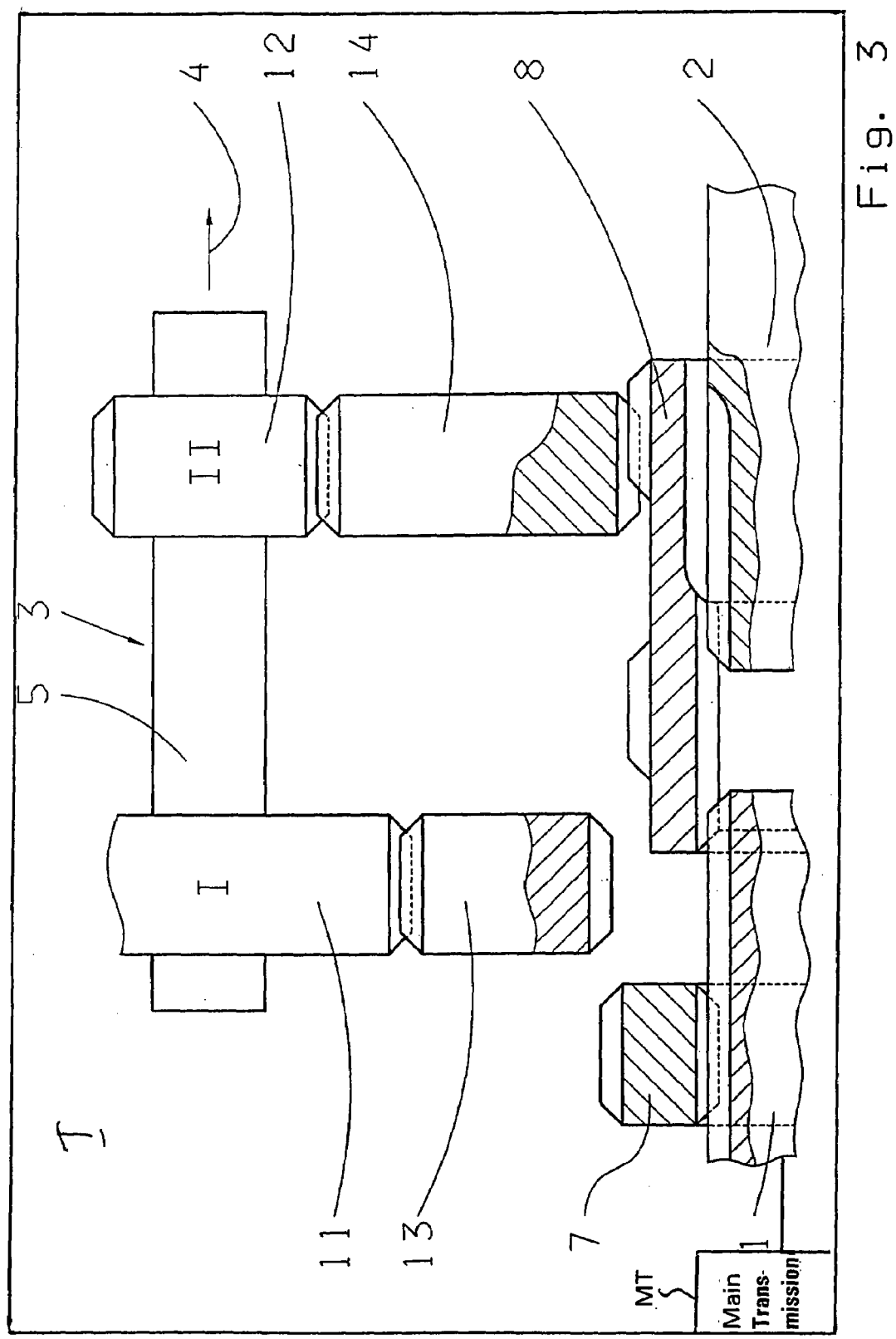
FIG. 3 is a cut partial view of the inventive transmission with the range change group in a third shifting state.

In FIG. 3 a third shifting state in the moving state of the vehicle is shown. The input shaft 1 and the output shaft 2 are coupled with each other via the second gear change sleeve 8. The second gear change sleeve 8 is connected with the second wheel 12 of the countershaft 5 via the second intermediate wheel 14, so that the power take off is driven with the ratio $i_{Step\ II}$.

Figure 4:
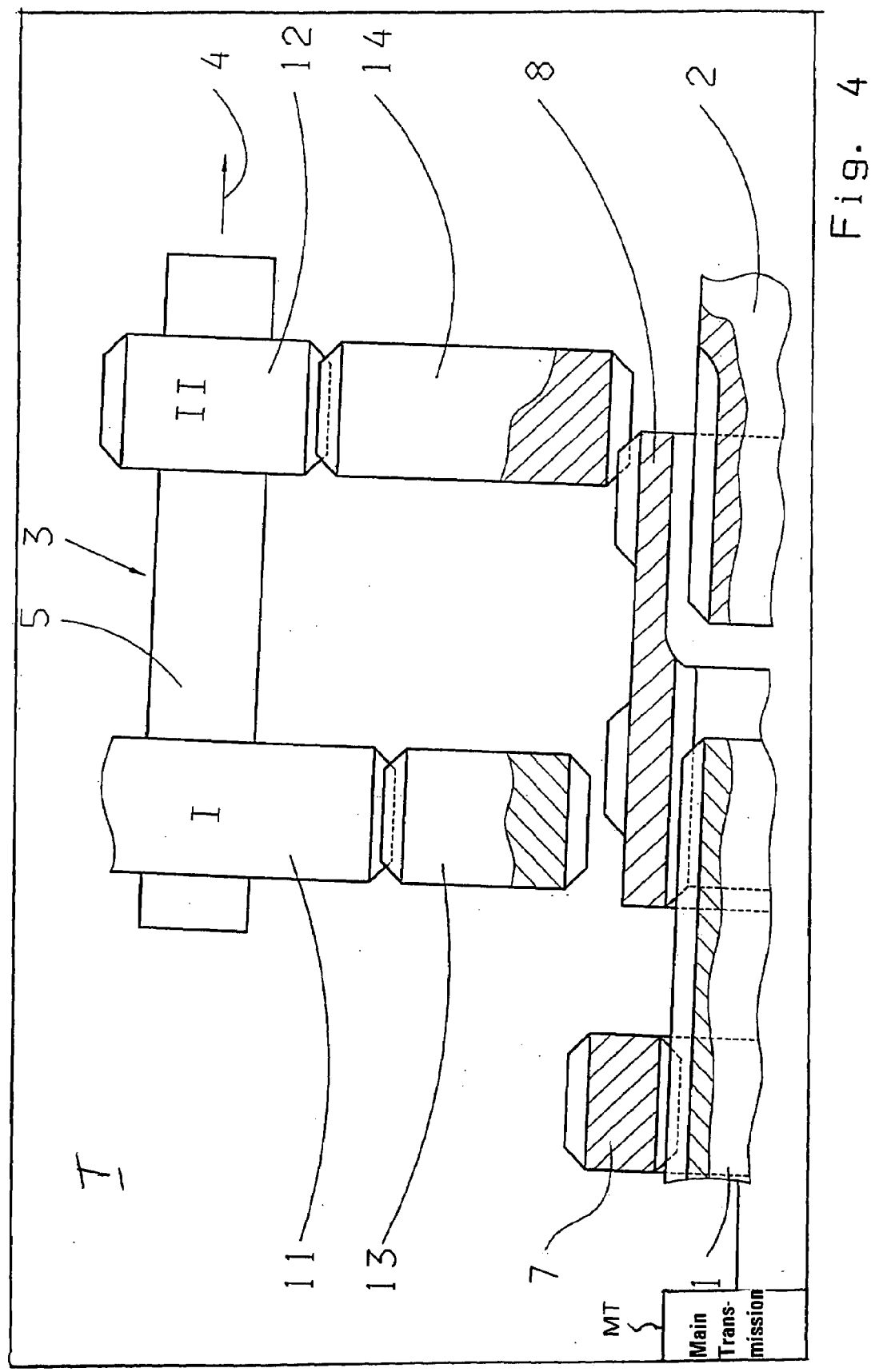
FIG. 4 is a cut partial view of the inventive transmission with the range change group in a fourth shifting state.

In FIG. 4 a fourth shifting state during the down time of the vehicle is shown. The input shaft 1 is coupled with the second gear change sleeve 8. The second gear change sleeve 8 is connected with the second wheel 12 of the countershaft 5 via the second intermediate wheel 14 so that the power take off is driven with the ratio $i_{Step\ II}$.

In the inventive transmission shown here, the power take off in the range change group 3 is driven via the countershaft 5, the power take off being doubly shiftable by the two countershaft wheels 11, 12. It is to be observed here that as ratio step the number of gears of the rest of the transmission is added. In this manner, the number of ratio steps available for the power take off results from the modification of the number of ratio steps of the main transmission MT and the number of ratio steps of the range change group 3.

In instant invention thus proposes a transmission in which, especially by virtue of the gear change sleeve unit, the existing ratio steps can be used for the power take off both during the down time of the vehicle and also during the driving state.

| Reference numerals |
| --- |
| 1 input shaft |
| 2 output shaft |
| 3 range change group |
| 4 arrow (power take off) |
| 5 countershaft |
| 6 gear change sleeve unit |
| 7 first gear change sleeve |
| 8 second gear change sleeve |
| 9 connecting plate |
| 10 shift fork |
| 11 first countershaft wheel |
| 12 second countershaft wheel |
| 13 first intermediate wheel |
| 14 second intermediate wheel |

The invention claimed is:

1. A transmission for a vehicle comprising:
an input shaft, an output shaft and a power take off comprising;
a countershaft (5);
a range change group having a first gear set defining a first range change group ratio and a second gear set defining a second range change group ratio;
a first gear change sleeve supported on the input shaft;
a second gear change sleeve supported on at least one of the input and output shaft, the second gear change sleeve having
a first axial position wherein the second gear change sleeve is non-rotatably connected to the output shaft;
a second axial position wherein the second gear change sleeve is non-rotatably connected to the input shaft and the output shaft; and
a third axial position wherein the second gear change sleeve is non-rotatably connected to the input shaft and not connected with the output shaft.

2. The transmission for a vehicle as set forth in claim 1 wherein in the third axial position the second gear change sleeve is non-rotatably connected to the input shaft and drives the second gear set defining a second range change group ratio independent of the output shaft and the operating state of the vehicle.

3. The transmission for a vehicle as set forth in claim 1 wherein in the second axial position the second gear change sleeve is non-rotatably connected to both the input shaft and the output shaft and drives the second gear set defining a second range change group ratio of the power take off shaft.

4. The transmission for a vehicle as set forth in claim 1 wherein in the first axial position the second gear change sleeve is non-rotatably connected to the output shaft and one of engaged and disengaged with the second gear set defining the second range change ratio of the power-take-off, and wherein the second gear change sleeve is disengaged with the second gear set, the first gear change sleeve is non-rotatably connected to the input shaft and the first gear change sleeve drives the first gear set defining the first range change group ratio of the power-take-off independent of the output shaft and the operating state of the vehicle.

5. The transmission for a vehicle as set forth in claim 4 wherein in the second axial position the second gear change sleeve is non-rotatably connected to both the input shaft and the output shaft and drives the second gear set defining a second range change group ratio of the power take off shaft.

6. The transmission for a vehicle as set forth in claim 4 wherein in the third axial position the second gear change sleeve is non-rotatably connected to the input shaft and drives the second gear set defining a second range change group ratio independent of the output shaft and the operating state of the vehicle.

* * * * *